Patented Aug. 19, 1941

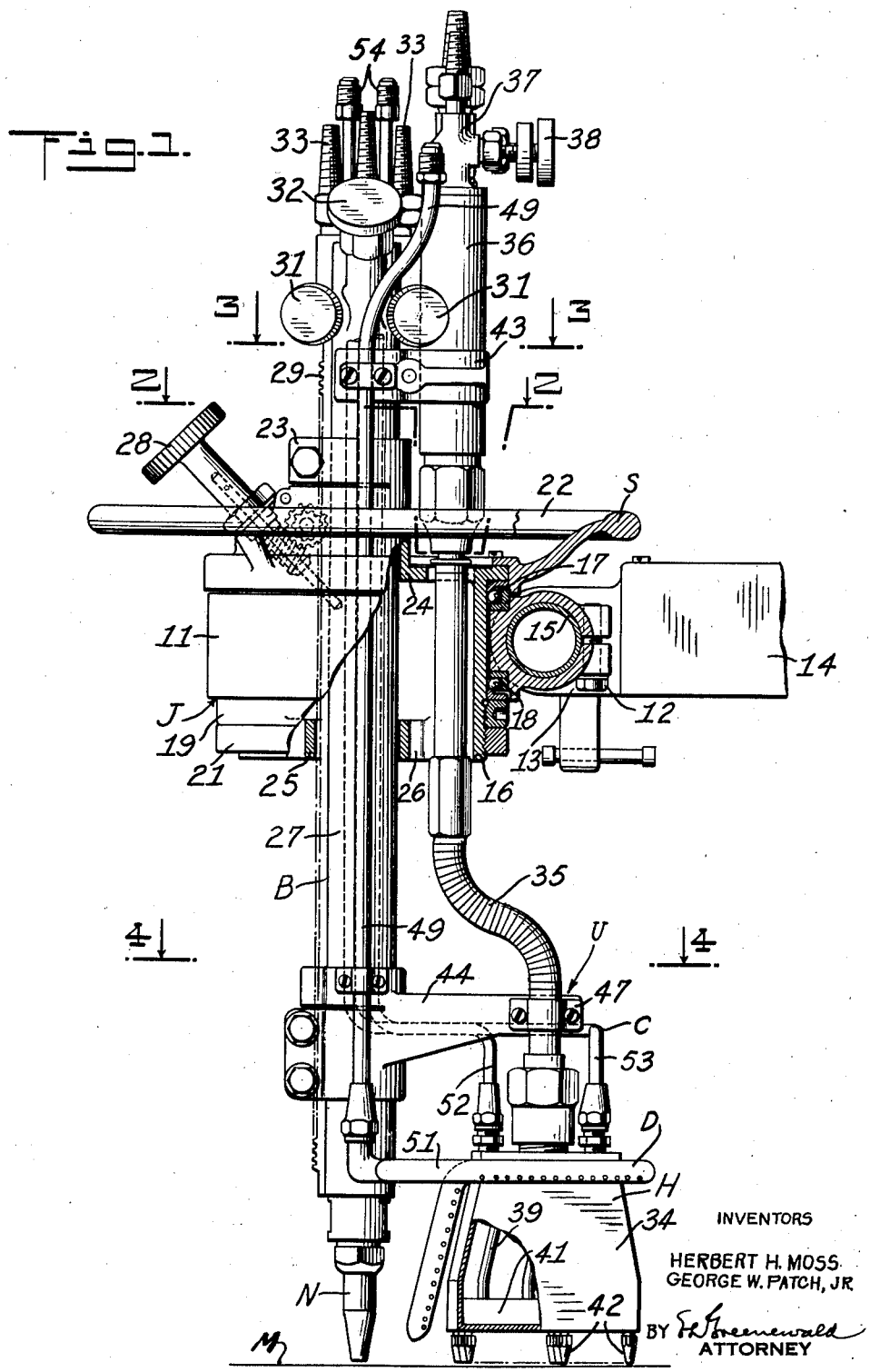

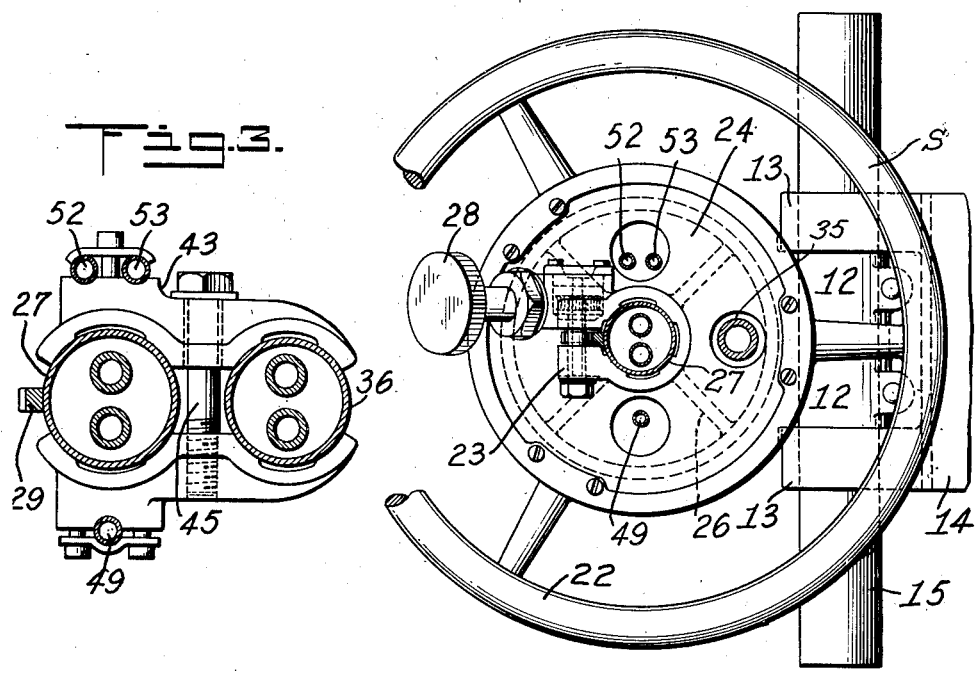
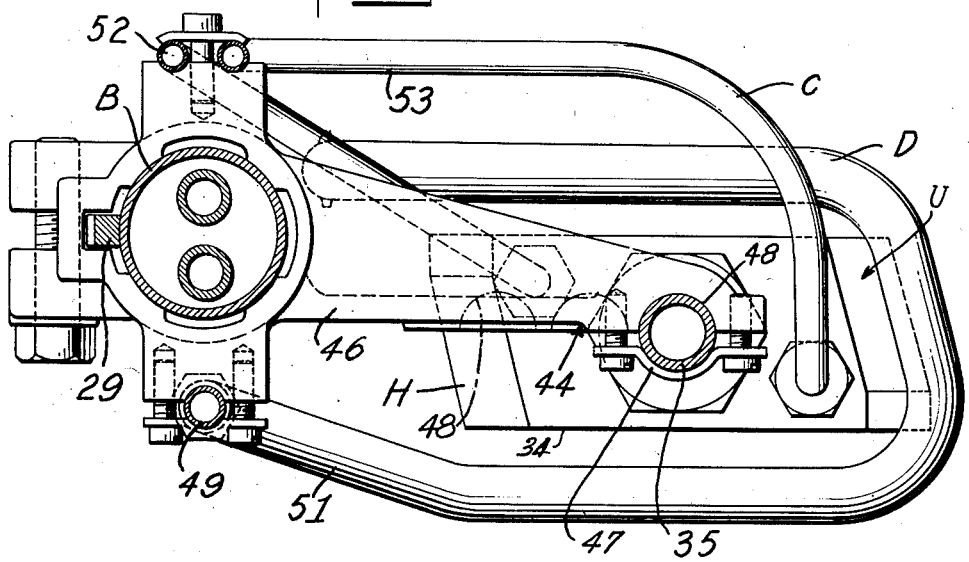

2,253,377

UNITED STATES PATENT OFFICE 2,253,377

CUTTING OR WELDING AND HEAT-TREATING APPARATUS

Homer W. Jones, Westfield, N. J., and Herbert H. Moss, Brooklyn, and George W. Patch, Jr., Kenmore, N. Y., assignors to The Linde Air Products Company, a corporation of Ohio Application March 30, 1939, Serial No. 264,918

5 Claims. (Cl. 266—23)

This invention relates to local heat-treatment, and more particularly to apparatus adapted to direct localized high-temperature heat against the surface of a metal body adjacent to the regions deleteriously affected by a welding, flame-cutting, or similar operation.

It is common procedure in flame-cutting or welding to direct a flame-cutting or welding jet against the surface of a ferrous metal body along a predetermined irregular path. The path to be followed is defined by an outline or a template of predetermined configuration which assists in manually or mechanically guiding the cutting or welding implement along the desired course. Unless the metal body operated upon is composed of mild or low carbon steel, the welding or cutting operation may induce hardening of the metal in the portions adjoining the path of travel as a result of the relatively rapid cooling from the high temperature produced by the welding or cutting operation.

Heretofore it had been customary to furnace-anneal metal bodies which had been hardened undesirably by such metallurgical operations, in order to restore the metal to a state of ductility that would allow the metal to be fabricated or used for structural purposes. Often such furnace treatment was uneconomical because of the excessive time and expense involved. Where large sections were being fabricated, annealing furnaces of the necessary size and shape were not always available. Furthermore, by the time the welding or cutting operation had been completed so that the body might be placed in a furnace, portions often had cooled substantially to room temperature so that the metal became permanently injured by the formation of surface checks and cracks. Localized high-temperature heat has been used to heat-treat portions of metal bodies hardened by a flame-cutting or welding operation, but no arrangement has been provided whereby localized reconditioning heat may be applied concurrently with a welding or cutting operation along a path of generally irregular configuration. For example, no provision has been made whereby a heat-treating head may follow along a kerf of generally irregular configuration at a point substantially separated from a cutting blowpipe so as to heat-treat the affected edges.

Accordingly, the principal objects of the present invention are to provide improved apparatus for welding or cutting a ferrous metal body and concurrently therewith heat-treating the portions metallurgically affected by the welding or cutting operation; to provide in such an apparatus means for manually shifting the position of the heat-treating means in accordance with the configuration of the path to be followed; to provide an improved cutting and heat-treating unit adapted to be connected to a conventional shape-cutting machine; to provide means for deflecting the flame envelope away from the supporting structure; and to provide means substantially remote from the flames for shifting the heat-treating head transversely with respect to the line of travel. These and other objects of the invention will become apparent from the following description and the accompanying drawings disclosing an embodiment of the present invention.

In the drawings—

Fig. 1 is a side-elevational view of a form of apparatus comprising a flame-cutting blowpipe and a heat-treating head embodying the invention, certain portions being shown in cross-section; and Figs. 2, 3 and 4 are cross-sectional views taken on the lines 2—2, 3—3, and 4—4, respectively, of Fig. 1.

Generally speaking, the invention comprises a heating head H spaced a substantial distance from a cutting or welding blowpipe B and adapted to project one or more sources of local high-temperature heat against successive zones along or adjacent to the line of travel of the cutting or welding blowpipe. The heating head H and the cutting or welding blowpipe B are supported for movement along a predetermined path over the surface of a metal body, being secured, for example, to the blowpipe-supporting arm of a conventional shape-cutting machine. Steering means S, such as a handwheel, permits the heating head H to be swivelled about a remotely positioned axis preferably the axis of the blowpipe B, whereby the heating head H may be adjustably positioned with respect to the path of travel. As shown in Fig. 1, the heating head H and blowpipe B may be constructed as a unit U, adapted to rotate about the blowpipe axis within a hollow tubular journal J. A deflector D provides means for projecting a screen of air or other inert fluid under pressure adjacent to the heating head and blowpipe B so as to deflect the secondary flame envelope away from the journal J, blowpipe B, and steering means S. Conduits C provide for the circulation of a convenient cooling medium through the heating head H.

As shown in Figs. 1 through 4, the unit U is supported within a generally circular collar 11 adjustably secured, as by means of split clamps 12 and 13, to a tubular mount 15 at the outer end of the blowpipe supporting arm 14 of a conventional shape-cutting machine, for example, of the type shown in Allison Patent 1,774,865, issued September 2, 1930. Any other appropriate means may be employed for supporting the heating head H and blowpipe B for universal movement in a plane substantially parallel with the surface of a metal body M.

A hub 16 is journaled within the collar 11 as by means of anti-friction bearings 17 and 18. End play is minimized through the use of a thrust collar 19, threaded on the lower portion of the hub 16 so as to bear against the bearing 18. A locking ring 21 secures the thrust collar 19 in adjusted position. Steering means S, such as a handwheel 22, is secured to the top portion of the hub 16 in any convenient manner. A central clamp 23 is preferably cast integrally with an apertured cover plate 24 at the top portion of the hub 16. A locating sleeve 25 is supported at the lower portion of the hub 16 by means of radial arms or spokes 26. It will thus be seen that the hub swivels freely within the collar 11 when the handwheel 22 is manually turned. The clamp 23 and sleeve 25 are coaxially positioned with respect to the hub 16 and serve to align and support the blowpipe B coaxially within the journal J.

The blowpipe B comprises any metallurgical tool capable of performing a welding, flame-cutting, or similar operation which is likely to induce hardening in the highly heated portions of the metal body during cooling. Although the blow-pipe is herein disclosed as a machine-cutting blowpipe, that is, one intended for machine mounting, and being adapted to project preheating and oxidizing jets through a nozzle N against the metal body M, the blowpipe may otherwise comprise an arc welding electrode, a cutting electrode, a welding blow-pipe, or any equivalent tool. The blowpipe is provided with a slender cylindrical body portion 27 held within the clamp 23 and the sleeve 25, as previously described, so that the blow-pipe axis extends substantially perpendicularly with respect to the horizontal top surface of the metal body M.

A conventional elevating mechanism 28 comprising a hand-operated worm, worm-wheel, and pinion-gear train, housed adjacent to the clamp 23, cooperates with a rack 29 secured longitudinally along the blowpipe body 27, for raising and lowering the blowpipe in the usual manner. The blowpipe B is provided with mixture-adjusting valves 31, cutting oxygen valve 32, and inlet nipples 33 for connection with the sources of the respective gases.

The heating head H is securely mounted in spaced relation to the blowpipe B and is adapted to revolve about the blowpipe axis as the handwheel 22 is turned. The heating head H comprises a multi-tip burner body 34 having a mixture gas conduit 35 extending from the discharge end of an auxiliary blowpipe body 36 to the inlet end of the burner body 34. Oxygen and acetylene valves 37 and 38 respectively regulate the flow of gases from the inlet nipples to the auxiliary blowpipe body 36 where the respective gases are mixed to form the combustible mixture. The mixture passes through the conduit 35 and through feeder tubes 39 to a mixture manifold 41 in the body 34 from which the mixture is discharged through a plurality of tips 42.

As shown in Figs. 1 through 4, the heating head H is clamped directly to the blowpipe B so that it is maintained at a fixed distance therefrom and revolves or swings in an orbit about the blowpipe as the blowpipe is swivelled by means of the handwheel 22. The head H is held in spaced relation to the blowpipe in any convenient manner, for example, by an upper bracket 43 and a lower bracket 44, best seen in Figs. 3 and 4, respectively. The upper bracket 43 comprises a pair of clamps secured together as by means of a machine screw 45. The parts may be readily detached for replacement or repair. The lower bracket 44 comprises an arm 46 extending from the blowpipe B and supporting the head H. The arm 46 is clamped at one end about the body 27 and at the other end about the conduit 35, which is illustrated in Fig. 4 as being accommodated within a recess 48 at the outer end of the arm 46, the conduit being held in place by means of a clamping plate 47. Accordingly, the bracket 44 maintains the head H in fixed spaced relation to the blowpipe B, the actual spacing being determined by such factors as the capacity of the heating head, the rate of travel, the type of metal undergoing treatment, and the particular heat-treatment desired.

By providing the simple clamping arrangement at each end of the bracket 44, the arm 46 is made readily detachable and may be replaced by one providing a different degree of spacing between the blowpipe B and the head H. By providing a series of successively adjoining recesses 48 along the arm 46, as indicated by broken lines in Fig. 4, and by making at least a portion of the conduit 35 of flexible tubing as shown in Fig. 1, the heating head may be positioned at any desired distance from the blowpipe B by engaging the conduit 35 within the desired recess 48. The arm 46 is preferably offset from the center line of the blowpipe B, as shown in Fig. 4, to support the rhomboidal shaped head H so that one of the side faces substantially coincides with the center of the kerf, when the parts are assembled as shown in Fig. 4. In this manner only those edges on the portion of the metal that is intended for subsequent use are subjected to a heat-treatment, it being unnecessary to perform a heat-treatment on the scrap metal. Where it is desired to heat-treat metal on both sides of the kerf, or where a weld is to be conditioned, the head H is located symmetrically with respect to the path of travel, and the width of the head H and its heating capacity selected to suit the needs.

Compressed air or other suitable inert fluid is adapted to be projected under high pressure through an air conduit 49 conveniently strapped to the brackets 43 and 44, as illustrated in the drawings. The conduit 49 terminates at its lower end in a section of tubing 51, closed at its far end and provided with means for projecting a screen of air outwardly in a generally horizontal direction to deflect flames which otherwise would attack the supporting and control mechanism of the apparatus. As shown in Fig. 1, the tubing 51 extends substantially about the head H near the top thereof and is provided with a series of small apertures extending through the wall of the tube and aligned so as to form an air barrier or screen through which the flames cannot penetrate. Successful results have been obtained with quarter-inch diameter tubing provided with a series of No. 60 drill-size apertures extending along the tube 51. Air at a pressure of approximately 60 lbs. per sq. in. produces a blast which insulates the remainder of the apparatus from the large secondary flames of the head H.

The heating head H is provided with cooling means C comprising water circulating tubes 52 and 53 having threaded terminal bushings 54 for connection with a source of circulating cooling medium. The tubes 52 and 53 may be held conveniently against the brackets 43 and 44 as shown in Figs. 3 and 4.

Apparatus of the type herein disclosed finds wide use in connection with welding and flame-cutting of the harder grades of steel. Although such steels may be defined generally as those that do not pass the prescribed bend tests after the welding or cutting operation, they include principally the low-alloy structural silicon, medium manganese, and nickel steels. By low-alloy steels is meant those grades having a nominal alloy content in the neighborhood of 3%. The nature of the treatment employed depends largely upon the specific metal under treatment. For the so-called quench-hardening grades, such as medium carbon plain steels, low carbon manganese-silicon steels, and the low carbon medium manganese structural steels, a mild preheat locally applied to the base metal immediately ahead of and concurrently with the gas cutting operation is effective in eliminating hardening tendencies of the metal during cooling. This result may be obtained by locating the multi-tip head H in advance of the nozzle N so that the zone adjoining the path of travel has sufficient heat soaked into the portions by the head H as to avoid a quenching action following the flame-cutting or other operation. The degree of preheat is not critical in most cases, but to be most beneficial the heating head H should apply as much heat as possible without causing melting of the top surface. With most quench hardening steels, satisfactory preheat is obtained when the successive zones in advance of the cutting or welding blowpipe are heated more or less uniformly throughout to a red heat. Satisfactory results have been obtained with a heating head of the type shown in Figs. 1 and 4 provided with eighteen tips having No. 65 drill-size orifices.

Where the metal body is composed of mildly air-hardening steels such as high-manganese structural silicon steel, nickel structural steel, and high-carbon plain steel, preheating in the manner described is not sufficient to counteract excessive hardening, and resort must be made to post heat-treatment. In many cases, proper conditioning of the steel may be effected by locating the heating head H so as to direct localized high-temperature heat against the top surface adjoining the path of travel at a point spaced behind the blowpipe B so as to raise the temperature of the metal above the critical range to provide an annealing action. Where the steel employed is strictly of an air-hardening nature, that is, one in which the dissipation of heat into the adjoining atmosphere and the conduction of heat into the adjoining body of metal occur at such a rate as to induce the formation of hard constituents, such as acicular martensite, a post-annealing treatment is not entirely effective because the hard constituents often reoccur during cooling from the annealing temperature. In such a case, the advantages of the annealing treatment are more or less limited to a refinement of the grain, with partial relief of stresses and a moderate increase in the ductility.

In order to completely restore such metals to a point where they will pass the prescribed bend tests, it has been found advantageous to apply a localized tempering heat instead of, or in addition to, the annealing flames. The former may be accomplished by locating the heating head H disclosed in Fig. 1 so as to reheat the portions adjacent to the path of travel, for example, the line of cut, to a point just below the critical range. It has been found advantageous to provide a space between the nozzle N and the heating head H of from two to five inches, according to operating conditions, so that the metal may first partially cool from the cutting or welding operation, that is, to a range preferably below 900° F. The capacity of the heating head is such as to then raise the temperature of the partially cooled portions to a temperature of from 1300° F. to 1400° F., characterized by a visible red in ordinary shop daylight, thereby heating the metal to a point just below the critical range to effect a tempering treatment. Such a localized tempering operation has been found effective for drawing the hardness, increasing the ductility, relieving stresses or modifying the hard constituents.

As an example of typical operation, a unit U of the type disclosed in Fig. 1 may be attached to the arm of a shape-cutting machine. With a suitable blowpipe B located over a metal body, the usual template-following head is engaged with the template to propel the blowpipe along the desired course and the operator controls its position with the aid of the steering means S, so as to maintain the head H along or adjacent to the line of travel. Ordinarily the path to be followed is clearly defined by the cutting or welding operation and the operator has no difficulty in maintaining the head H in proper alignment; when the apparatus is employed for preheating in conjunction with flame-cutting, the proper position for the head H may be determined directly from observation of the template and follower. In other cases a chalk-line formed directly on the workpiece, may indicate the proper position for the preheating head H at all times.

Various modifications of the herein described apparatus may be made without departing from the scope of the invention or sacrificing any of its advantages.

We claim:

1. A flame-cutting and heat-treating unit adapted to progressively remove ferrous metal along a path on a metal body, and to apply localized reconditioning heat to the successive metallurgically-affected portions along the path of metal removal, comprising a flame-cutting blowpipe adapted to discharge preheating and flame-cutting jets; a heating head operable independently of said blowpipe and positioned remotely from said blowpipe; a journalled mounting for rotatably supporting said blowpipe and said head as a unit, the axis of said journal being substantially perpendicular to said surface; and an apertured conduit adjacent to said head and adapted to contain inert fluid under pressure for projecting a screen of said fluid adjacent to and substantially transversely of said heating head, to deflect the secondary flames of said head away from said journal and said blowpipe.

2. A flame-cutting and heat-treating unit adapted to progressively remove ferrous metal along a path on a metal body, and to supply localized reconditioning heat to the successive metallurgically-affected portions along the path of metal removal, comprising a flame-cutting blowpipe adapted to project preheating and cutting gas jets against said body; a heating head in spaced relation to said blowpipe; conduits for supplying said heating head with combustible gas and circulating cooling medium, respectively; and a hollow journal for rotatably supporting said unit; said blowpipe and said conduits extending through said hollow journal and being rotatable therewith.

3. Metallurgical apparatus comprising a support; a heating head depending from said support and adapted to project a flame downwardly against the surface of a metal body; and a conduit provided with at least one aperture adapted to project inert fluid under pressure adjacent to said head so as to deflect rising portions of said flame in a substantially horizontal direction.

4. Apparatus as claimed in claim 3 wherein said conduit extends substantially about said head at a point spaced above said surface, said conduit being provided with a plurality of apertures extending substantially horizontally through the wall of said conduit for projecting jets of inert fluids from said conduit to form a screen for deflecting flames from said head.

5. Metallurgical apparatus comprising a support; a heating head mounted on said support and adapted to project a flame against the surface of a metal body; and flame deflecting means comprising a conduit adjacent to said head, said conduit being provided with a plurality of substantially aligned apertures extending through the wall of said conduit for projecting jets of inert fluid such as air from said conduit to form a screen for deflecting flames from said head.

HOMER W. JONES.
HERBERT H. MOSS.
GEORGE W. PATCH, Jr.

CERTIFICATE OF CORRECTION.

Patent No. 2,253,377.  August 19, 1941.

It is hereby certified that error appears in the above numbered patent requiring correction as follows: In the grant, line 1, strike out "HOMER W. JONES, of Westfield, New Jersey, and"; in the heading to the printed specification, line 4, strike out "Homer W. Jones, Westfield, N.J., and"; page 4, second column, line 16, in the signature to the specification, strike out "HOMER W. JONES."; in the heading to the drawings, Sheets 1 and 2, for "H. W. JONES ET AL" read --H. H. MOSS ET AL--; and that the said Letters Patent should be read with this correction therein that the same may conform to the record of the case in the Patent Office.

Signed and sealed this 13th day of January, A. D. 1942.

(Seal)

Henry Van Arsdale,
Acting Commissioner of Patents.